Jan. 15, 1957   H. STÜDLE ET AL   2,777,589
VEHICLE-MOUNTED EXCAVATING AND MATERIAL-HANDLING EQUIPMENT
Filed March 24, 1954   5 Sheets-Sheet 4

INVENTORS
Hermann Stüdle
Jean-Pierre Marti
By Stevens, Davis, Miller & Mosher
ATTORNEYS Jan. 15, 1957  H. STÜDLE ET AL  2,777,589
VEHICLE-MOUNTED EXCAVATING AND MATERIAL-HANDLING EQUIPMENT
Filed March 24, 1954  5 Sheets-Sheet 5

INVENTORS
Hermann Stüdle
Jean-Pierre Marti
ATTORNEYS

United States Patent Office 2,777,589
Patented Jan. 15, 1957

2,777,589

VEHICLE-MOUNTED EXCAVATING AND MATERIAL-HANDLING EQUIPMENT

Hermann Stüdle and Jean-Pierre Marti, Neuchatel, Switzerland, assignors to Draize S. A., a society of Switzerland Application March 24, 1954, Serial No. 418,338

Claims priority, application Switzerland March 26, 1953

6 Claims. (Cl. 214—140)

This invention relates to vehicle-mounted excavating and material-handling equipments which comprise more particularly a shovel or scoop mounted on a motor vehicle and adapted for soil scooping or excavating, loading the excavated materials and dumping or carrying them away.

Motor vehicles provided with such an equipment may be tractors with either wheels or tracks, lorries, etc.

Constructions are known in the art with a scoop mounted on a tractor or other motor vehicle by means of levers which move under control of pistons and drive the scoop in its lowered position in front of the vehicle for scooping or breaking the soil and loading the excavated materials into the scoop which can be driven afterwards into an elevated position either in the front of or behind the vehicle for finally dumping these materials into a van or a lorry.

However, in the constructions known in prior art and in which materials may be dumped at will either in front or or behind the vehicle, there is either one or both following drawbacks:

The displacement of the scoop from its lowered position, in front of the vehicle, into its elevated position behind it, is controlled by two pistons which the operator of the bulldozer must actuate alternatively;

While displacing the scoop over the vehicle, the materials which it contains remain therein more or less by their own inertia, except in one particular position of the scoop above the roof of the vehicle, in which the scoop is almost horizontal.

It is therefore an object of the invention to avoid these drawbacks and provide a vehicle-mounted excavating and material-handling equipment allowing materials to be caught, loaded and then dumped at will either in front of or behind the vehicle, the scoop which contains these materials thereby always remaining almost horizontal, when it is moved along its whole travelling path, these displacements of the scoop being controlled by a single piston. In a preferred embodiment of the invention the equipment comprises two pairs of each, booms, levers and pistons; and one pair of crank arms, these elements being provided in the following manner:

The booms of a first pair are articulated at both ends, on the one hand to the scoop and, on the other hand, to one pair of levers as well as to the crank arms;

The booms of the second pair are also articulated at both ends on one hand to the scoop and, on the other hand, to the second pair of levers;

The levers of both pairs and the crank arms pivot about parallel and fixed axes;

Each pair of levers is actuated by one pair of pistons; thereby, the pistons which actuate the first pair of levers being adapted for displacing the booms in a vertical plane and for rotating the latter almost through an angle of 180° when the corresponding levers rotate through an angle of about 90° said booms thus guiding the scoop from its lowered position in front of the vehicle, into an elevated position behind the latter after having passed said scoop over the vehicle; and, the second pair of pistons being adapted for dumping the scoop at will in front of or behind the vehicle.

A further object of the invention is to provide an equipment in which the displacements of the scoop, under the action of the first pair of pistons always leave the scoop parallel to itself.

Still further objects of the invention will appear from the following description.

One embodiment of the invention is shown diagrammatically and by way of example in the drawings affixed to this specification and forming part thereof.

In the drawings.

Like reference numerals designate like elements throughout the drawings.

Figure 1:
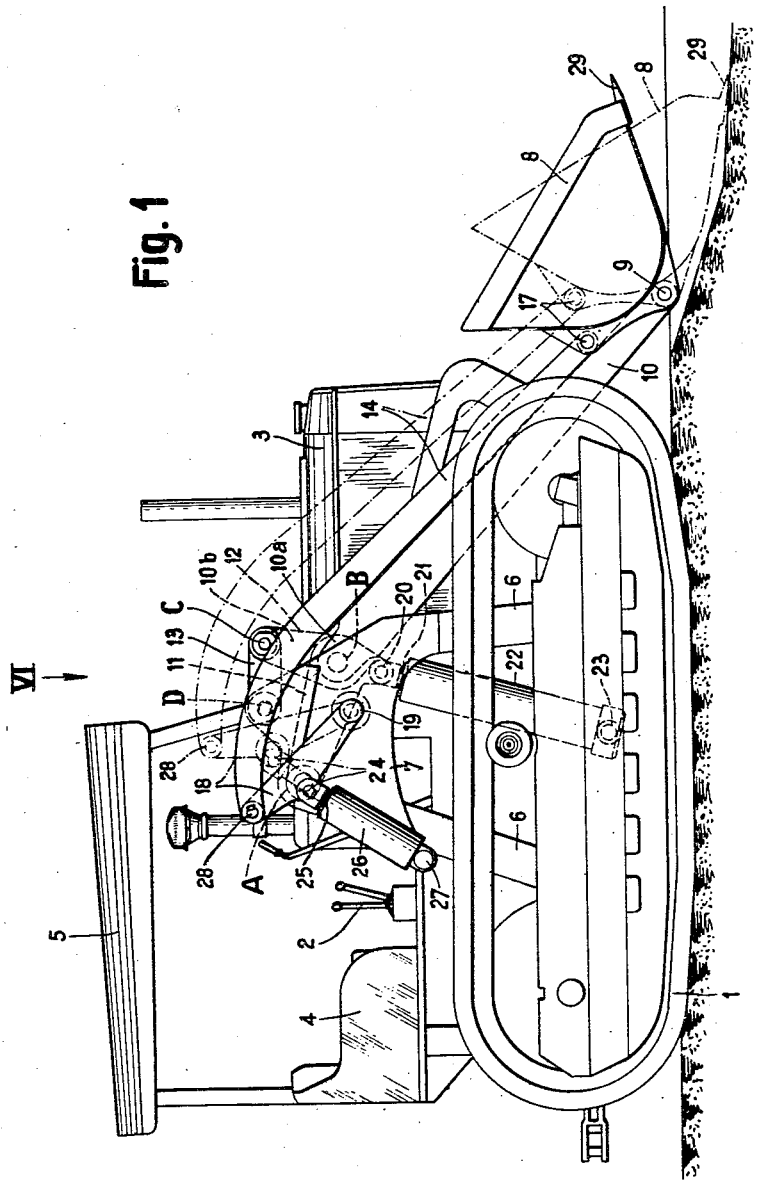
Fig. 1 is a side elevation of the equipment embodying the invention, mounted on an endless tread tractor, the scoop being in its lowered position in front of the vehicle, in which it may either scoop and/or load the materials to be removed.

The bulldozer represented is mounted on an endless tread tractor 1 of common type, on which the steering device 2 and the control pedals of the motor 3 as well as the control means for operating the scoop, are gathered in the same control station 4 situated under the roof 5.

Instead of mounting the equipment according to the invention on an endless tread tractor we could also mount it on an ordinary tractor with wheels, or on a lorry, or on every appropriate motor vehicle.

This equipment is firmly connected to the tractor by means of upright columns 6 integral with the frame of the tractor and provided on both sides thereof. The two columns 6, on one side of the motor, are themselves connected by two plates 7 extending in parallel with the sides of motor 3. It is between these plates that the equipment according to the invention is mounted on the tractor.

Since said equipment is constituted by similar members on both sides of the motor 3, only those members on one side of the motor will be described hereinafter.

Figure 6:
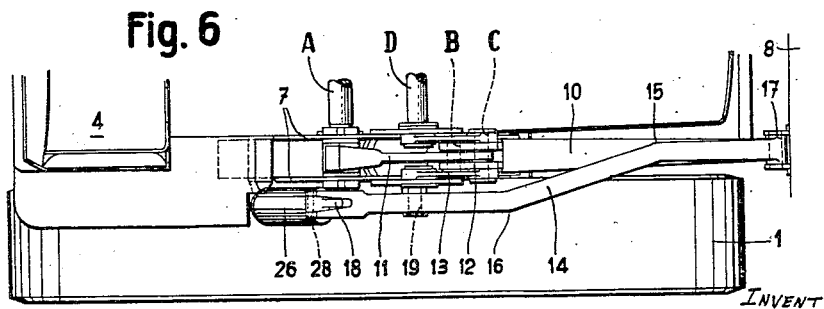
Fig. 6 is a view of Fig. 1 into the direction of arrow VI.

A scoop 8 of common type, provided with excavating teeth 29, is guided by two pairs of rigid booms. Two booms of one pair are actually arranged symmetrically on both sides of motor 3. Boom 10 (Fig. 1) of one of said pairs is articulated in 9 at one of its extremities to the scoop 8. The other extremity of boom 10 is formed with two webs enclosing the end of a lever 11 (Fig. 6). Boom 10 and lever 11 are jointed together by an axle B extending through said webs of boom 10 and through lever 11 these two elements being thus articulated one to the other. Lever 11 is pivotally mounted and fixed on an axle A extending perpendicularly to plates 7 in which it is journalled. Boom 10 comprises a heel constituted also by two webs 12. The extremities of these webs are pivoted each at one end of a crank arm 13. These two crank arms are in turn rotatably mounted in D, on each of said plates 7, around a fixed axis which is perpendicular to the plates.

Boom 10, lever 11, webs 12 and crank arms 13, provided on one side of motor 3, move thus in planes parallel to plates 7.

The two axes A and D are provided at a distance apart from one another that is smaller than the length of lever 11. Moreover, crank arms 13 and webs 12 constituting the heel of boom 10, have almost the same length approximately equal to half that of lever 11. The length of webs 12 is of course to be identified with the distance between the two axes B and C. The relative locations of axes A and D and the length of lever 11, as well as boom 10 with its heel, are provided so that axes A, B and C define, in a plane extending in parallel with plates 7, a right-angled triangle having its right angle in B, when scoop 8 is almost in its position represented in Fig. 1. Eventually in the latter position of scoop 8, the axis D is situated almost on the hypothenuse of said right-angled triangle.

The scoop 8 is kept in the desired angular position around articulation 9 by the booms 14, which constitute the second of said pairs of booms. Booms 14 allow displacements of the scoop in which the latter keeps its directions. Each of said booms is bent at 15 and 16 (Figs. 5 and 6) and is articulated to the scoop in 17. The other end of boom 14, also formed with two webs, is articulated by means of an axle 28 at the end of a lever 18 located on Fig. 1 at least partially on front of the first plate 7. Lever 18 moves in a plane parallel to plate 7 and pivots around an axle 19 by means of which it is connected to the first of said plates.

Lever 11 is jointed by a pin 20 (Fig. 2) to the end of the rod 21 of a hydraulic piston with double effect, 22, the cylinder of which is pivotally mounted at 23 on the frame of the vehicle. Similarly lever 18 is connected by a pin 24 to the end of the rod 25 of the second hydraulic piston with double effect 26, the cylinder of which is itself rotatably mounted in 27 on column 6 of the vehicle.

Figure 5:
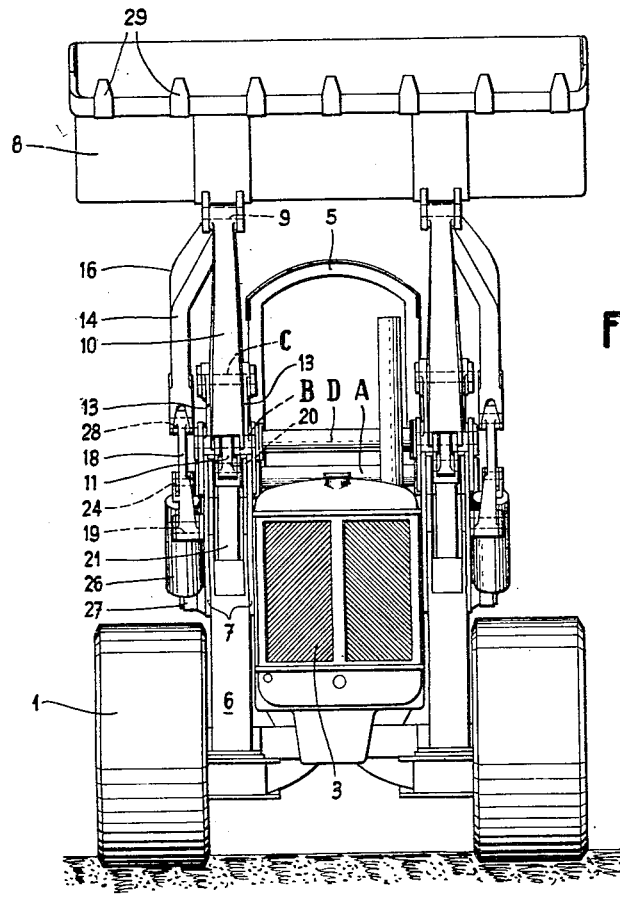
Fig. 5 is a view of Fig. 2 into the direction of arrow V.

The elements described above (boom 10 with heel, boom 14, lever 11, crank arms 13, hydraulic pistons 22 and 26, column 6 and plates 7) are identical on both sides of the motor 3 and are symmetrically arranged as already stated. In order that the movements of said elements be perfectly synchronized on both sides of the vehicle, axes A and D extend from one side of the motor 3 to the other (Figs. 5 and 6).

The equipment described operates as follows:

In the working or loading position of scoop 8, represented in Fig. 1, the latter is ready to catch materials by excavating the soil, should the occasion arise. According to the configuration of the latter or to the location of the materials to be catched and removed, the scoop 8 may be suitably directed by means of the two hydraulic pistons 26 which may be actuated by the operator of the machine from the control station 4, in a manner which is not represented. The oil sent under pressure into these pistons may actually push their rod 25 outward the cylinder, into their position represented in dot-dash lines. During this movement of rods 25 of the two pistons 26, levers 18, booms 14 and scoop 8 only are moving. The latter in particular pivots clockwise around the articulation 9 which is at rest. It will be obviously observed that rods 25 of pistons 26 may be locked in every intermediate position between the two extreme positions represented in full lines and in dot-dash lines, respectively. The positions of these rods are particularly chosen so that the teeth 29 of scoop 8 are directed and arranged in an appropriate manner in order to catch the materials to be removed or in order to enter the soil which must be excavated.

When the scoop 8 is loaded, it is driven back into its position represented in full lines in Fig. 1, by causing rods 25 to enter their respective cylinders of pistons 26 under action of appropriate control means, which are not represented.

Figure 2:
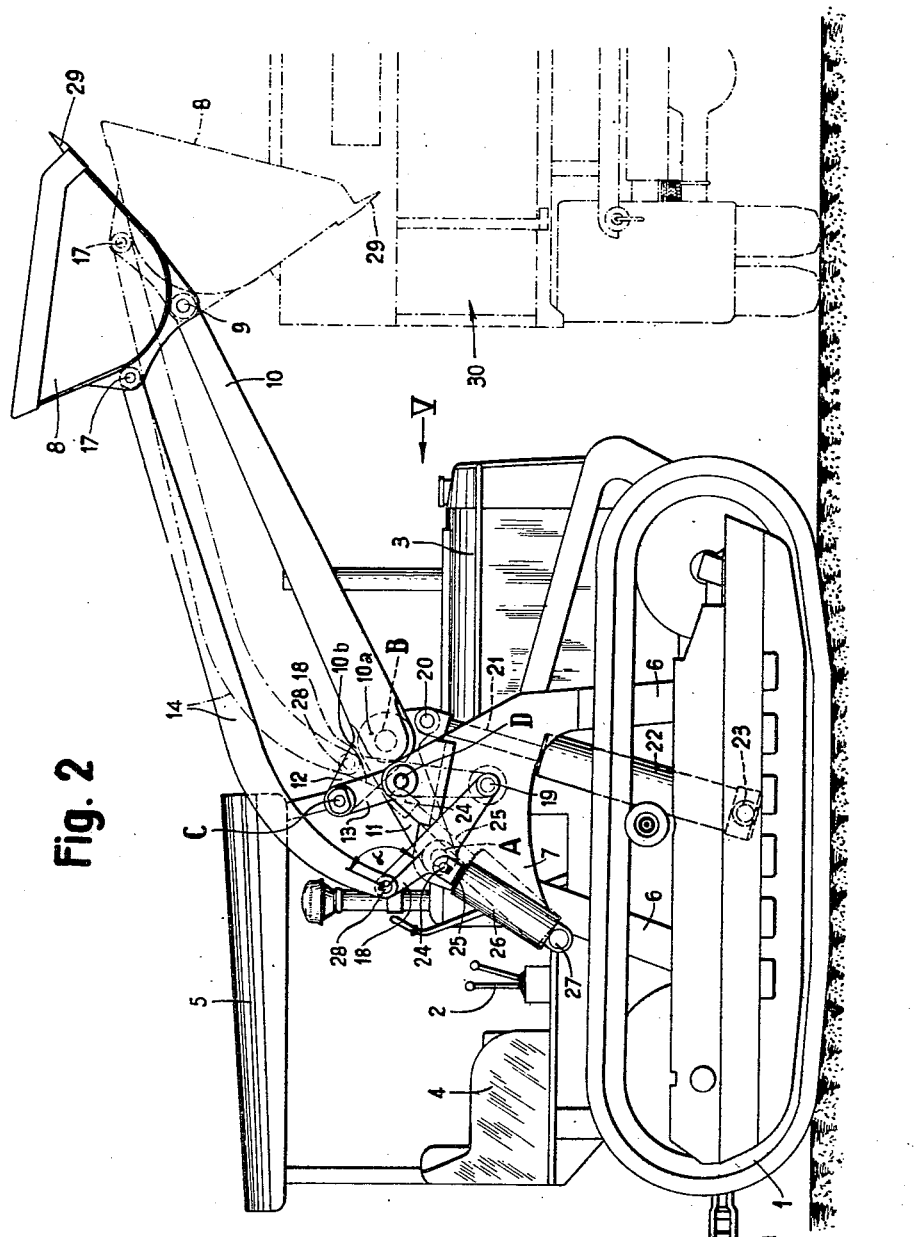
Fig. 2 is an analogous view to that of Fig. 1, the scoop being however in its elevated position in front of the vehicle, in which it is ready to dump the materials it contains.

The scoop 8 may then be raised from the position represented in Fig. 1 into that represented in Fig. 2, by actuating pistons 22 by means which are not represented, in such a manner, that the rods 21 of those pistons are pushed outward their cylinders.

It will again be observed that the rods 21 may be locked temporarily in every intermediate position, for instance that represented in Fig. 2, in which the materials contained within the scoop may be dumped, for instance into the van of a lorry 30, the vehicle having previously been turned around a vertical axis. The dumping movement of the scoop is again controlled only by pistons 26. It will be observed that angle $\alpha$ between levers 18 and booms 14 is in any case smaller than 180°, as long as the scoop is in a position near that represented in Fig. 2. Pistons 26 push consequently the booms 14 towards the front of the vehicle, thereby swinging scoop 8 clockwise around the articulation 9, which is at rest, until the scoop comes into the position represented in dot-dash lines in Fig. 2 in which rods 25 of said pistons have been entirely pushed out of their respective cylinders. The scoop may of course be elevated and kept by pistons 22 at the desired height in order to dump its contents at the desired place, into the vehicle at disposal, van, lorry, wagon, etc.

The operation of the equipment according to the invention, with regard to Fig. 2, is not at all distinct from that of the devices known in the art, but the possibilities of the equipment described are not limited to that operation only.

Instead of stopping the scoop 8 in the position represented in Fig. 2, pistons 22 may set on their operation.

Figure 3:
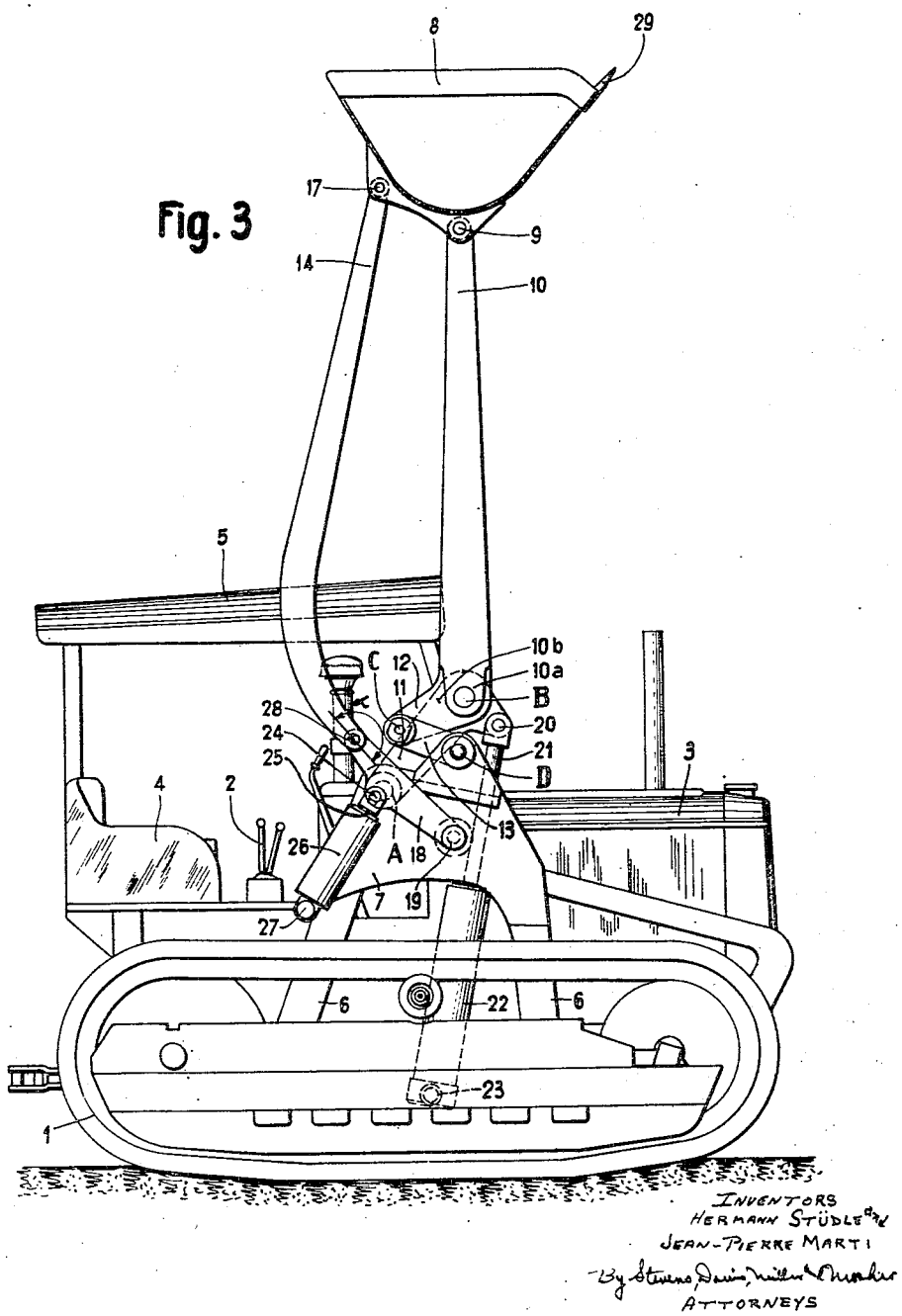
Fig. 3 is a view analogous to the preceding figures, the scoop being in its upmost position above the roof of the vehicle.
Figure 4:
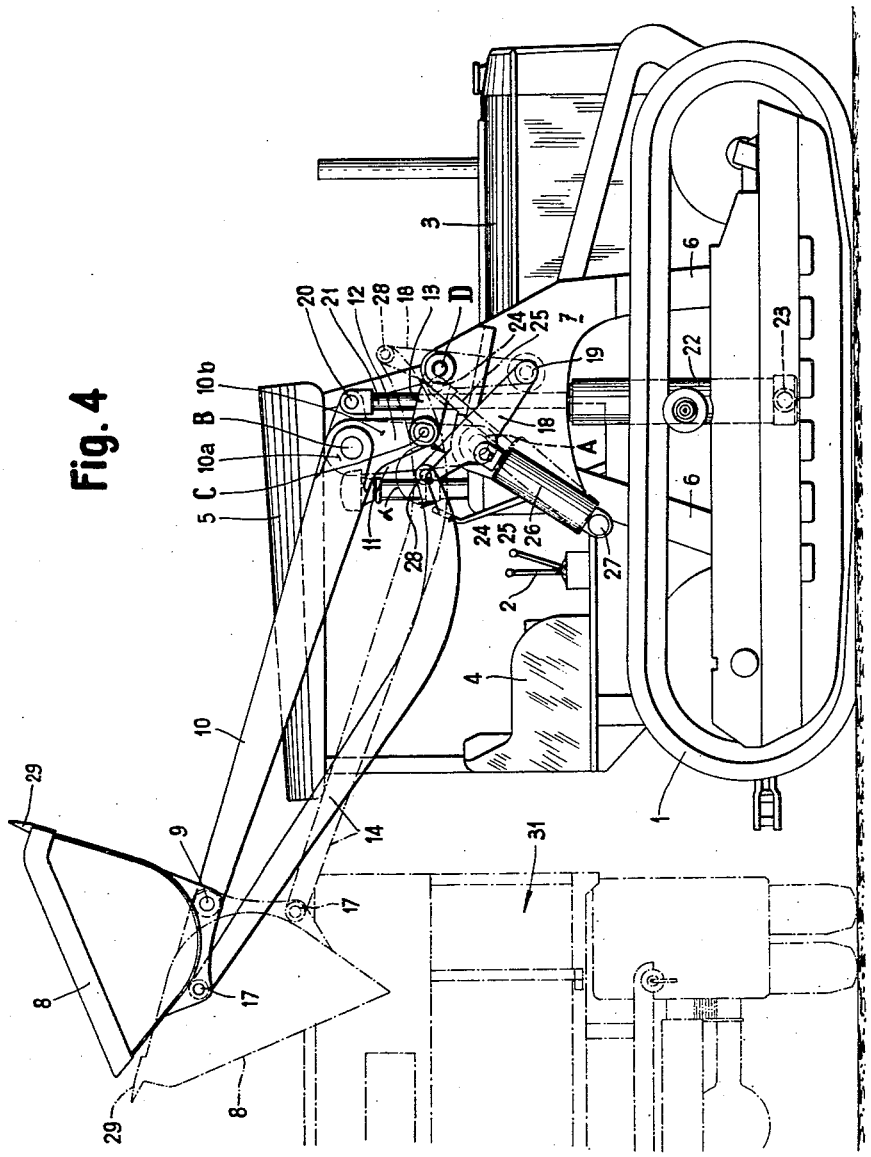
Fig. 4 is a view analogous to the preceding figures, the scoop being in its rearmost position, behind the vehicle, in which it is ready to dump the materials it contains.

Scoop 8 passes then from the position represented in Fig. 2 first into that represented in Fig. 3, in which the angle $\alpha$ is equal to 180°, and then into that represented in Fig. 4 in which that angle $\alpha$ is almost equal to 270°. Consequently to the sizes of that angle, the scoop 8 in Fig. 4 swings counterclockwise around the immobile articulation 9, if pistons 26 are actuated in order that their rods are pushed out of their respective cylinders. When rods 25 are in the outmost position with respect to said cylinders, levers 18, boom 14 and scoop 8 are in their respective positions represented in dot-dash lines in Fig. 4, and the contents of scoop 8 may be dumped into the van of a lorry 31 which has been driven behind the vehicle on which the equipment according to the invention is mounted.

In this latter case scoop 8 may be driven many times one after the other from the position represented in Fig. 1 into that represented in Fig. 4, without requiring the vehicle on which the equipment according to the invention is mounted to be turned round a vertical axis. It is sufficient to drive the lorry 31 into an appropriate position behind the bulldozer, from where it drives away as soon as it is loaded.

Although the distance between axis B and 28 does not always remain constant when the scoop passes from the position represented in Fig. 1 into that of Fig. 4, the booms 10 and 14 keep said scoop almost always parallel to itself throughout its way in order that its contents will not be spilled or spread at an inopportune moment.

In comparing the positions of the scoop and more particularly those of booms 10 in Figs. 1 and 4, it will be observed that said booms have turned through an angle of 180° in their plane, whereas their extremity B have moved along an arc of circle of almost 90°.

On the other hand, in the position of Fig. 1 it will be observed that lever 11 and boom 10 are arranged almost perpendicularly to the direction of thrust of piston 22, which means that the momentum of the piston onto the lever 11 has it greatest possible effect. It is also the position of the scoop in which the materials to be removed oppose their greatest resistance to said scoop, when it catches these materials and particularly when it excavates the soil.

As soon as the scoop has passed its upmost position (Fig. 3), during a backward displacement, its own weight will help drive it backwards, until it reaches the position represented in Fig. 4. Piston 22 has thus to brake this last movement of the scoop.

After the scoop has dumped towards the rear of the vehicle, piston 22 must drive it again towards the front thereof. During the first motion from the position of Fig. 4, the lever arm of the piston is very small and the boom of the scoop is almost horizontal, but since the scoop is empty the piston can raise it without difficulty, into its upmost position, represented in Fig. 3. From there on, the scoop moves forwards by its own weight, into the position represented in Fig. 1, and piston 22 has to brake this displacement.

It will be understood that various changes may be made in the configuration and arrangement of the parts hereabove described and shown in the drawings without departing from or sacrificing the advantages thereof.

We claim:

1. In a vehicle-mounted excavating and material-handling equipment, the combination of a scoop and, on each side of the vehicle, of a first lever pivotally mounted about a first fixed axis, a pair of crank arms pivotally mounted about a second fixed axis extending in parallel to the first one, a first boom articulated at one end to said scoop and at the other end, at two different points, both to said lever and to said pair of crank arms, a first piston having a rod articulated to said lever for driving said boom in a plane substantially vertical and adapted for rotating said boom through an angle of almost 180° when said lever rotates itself through an angle of almost 90°, a second lever pivotally mounted about a third fixed axis extending in parallel to said two first axes, a second boom articulated at one end to said scoop and at the other end to said second lever, and a second piston having a rod articulated to said second lever, thereby said first piston being adapted for driving said scoop from a lowered position in front of the vehicle towards a position behind it by passing over the vehicle, and said second piston being adapted for swinging said scoop in order to dump its contents in front of the vehicle as well as behind it, said scoop thereby always moving parallel to itself when it is driven by said first piston.

2. The combination of claim 1, in which said second boom and said second lever are so arranged as to enclose an angle smaller than 180° when said scoop is in front of the vehicle, and an angle larger than 180° when said scoop is behind the vehicle, in order to allow said second piston to swing the scoop for dumping, with the same movement, in every scoop position.

3. The combination of claim 2, in which the distance between said two first fixed axes is smaller than the length of said first lever.

4. The combination of claim 3, in which said crank arms have a length substantially equal to the distance of the two said articulations of one end of said first boom, the length of said crank arms being approximately half that of said first lever.

5. The combination of claim 4, in which, when said scoop is in its lowered position in front of the vehicle, said first fixed axis and the two said articulations of one end of said first boom substantially define, in a vertical plane, a right-angled triangle, the right angle of which being represented by the articulation of said first boom with said first lever.

6. The combination of claim 5, in which said second fixed axis lies on the hypothenuse of said right-angled triangle, when said scoop is in its said lowered position.

No references cited.